US011936151B2

(12) United States Patent
Wankoff et al.

(10) Patent No.: US 11,936,151 B2
(45) Date of Patent: Mar. 19, 2024

(54) CONNECTOR WITH PLATED PLASTIC CONTACTS

(71) Applicant: Apple Inc., Cupertino, CA (US)

(72) Inventors: Eric B. Wankoff, San Francisco, CA (US); Mahmoud R. Amini, Sunnyvale, CA (US); Peter J. Cameron, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/472,369

(22) Filed: Sep. 10, 2021

(65) Prior Publication Data

US 2023/0079265 A1 Mar. 16, 2023

(51) Int. Cl.
*H01R 43/00* (2006.01)
*H01R 43/24* (2006.01)

(52) U.S. Cl.
CPC .......... *H01R 43/005* (2013.01); *H01R 43/24* (2013.01)

(58) Field of Classification Search
CPC .............................. H01R 43/005; H01R 43/24
See application file for complete search history.

(56) References Cited

U.S. PATENT DOCUMENTS 7,335,049 B2 * 2/2008 Alarcon ............... H01R 9/2491 439/409
2014/0002215 A1 * 1/2014 Ionescu ................. H01H 50/18 335/18

* cited by examiner

*Primary Examiner* — Paul D Kim
(74) *Attorney, Agent, or Firm* — Kilpatrick Townsend & Stockton LLP

(57) ABSTRACT

Connector assemblies and contacts that can be moisture-resistant, light-weight, space efficient, and can be readily manufactured. The connector assembly can be formed of two or more materials that can be molded together to reduce the chance of leakage at seams between the two materials. One of the two materials can have an affinity for plating materials while the other material can have an aversion to plating materials. The first material can be plated and used as contacts, while the second can resist plating and can be used to separate regions of the first material into two or more contacts.

25 Claims, 8 Drawing Sheets

CONNECTOR WITH PLATED PLASTIC CONTACTS

BACKGROUND

Power and data can be provided from one electronic device to another over contacts on the electronic devices. In some electronic systems, contacts of two electronic devices can come into direct contact with each other without the need for intervening cables. For example, contacts on a first electronic device can form physical and electrical connections with contacts at a surface of a second electronic device. The contacts of an electronic device can be housed in a connector assembly, which can be located in or attached to a device enclosure that at least partially houses the electronic devices.

These connector assemblies and contacts can be exposed to liquids and fluids that can leak into an electronic device. For example, a user can purposely or inadvertently submerge an electronic device or a connector assembly in a liquid. A user can spill a liquid or perspire on contacts of a connector assembly of an electronic device or cable. These actions can cause liquid to seep through seals, seams, or other portions of a contact or contact housing, thereby possibly damaging the electronic device.

These connector assemblies and contacts can be utilized in wearable devices, such as rings, bracelets, earrings, and others. Since they are worn by a user, their weight can be a factor in regards to user fatigue and satisfaction. It can therefore be desirable to be able to employ light-weight connector assemblies and contacts.

Electronic devices for these connector assemblies can be small. As a result, these connector assemblies can consume a large amount of space inside the electronic device. Accordingly, it can be desirable that these connector assemblies be small.

Some of these electronic devices become tremendously popular, and their connector assemblies and contacts can be sold in very large quantities. As a result, it can be desirable that these connector assemblies and contacts can be readily manufactured such that customer demand for them can be met.

Thus, what is needed are connector assemblies and contacts that can be moisture-resistant, light-weight, space efficient, and can be readily manufactured.

SUMMARY

Accordingly, embodiments of the present invention can provide connector assemblies and contacts that can be moisture-resistant, light-weight, space efficient, and can be readily manufactured.

An illustrative embodiment of the present invention can provide moisture-resistant connector assemblies and contacts. A connector assembly can be formed of two or more materials that can be molded together to reduce the chance of moisture ingress at seams between the two materials. A first material can have an affinity for plating materials while the second material can have an aversion to plating materials. The first material, having an affinity for plating materials, can be plated and used as contacts, while the second, having an aversion to plating materials, can resist plating and can be used to separate regions of the first material into two or more contacts.

These and other embodiments of the present invention can be made light-weight by using light-weight materials. For example, plastic, nylon, polycarbonate, acrylonitrile butadiene styrene (ABS) or other thermoplastic polymer or resin, a copolymer combination of polycarbonate and ABS, or other material can be used for the first material and the second material.

These and other embodiments of the present invention can be molded or otherwise formed using various techniques. For example, they can be formed using injection molding, insertion molding, 3-D printing, over-molding, or other molding method or other technique.

These connector assemblies and contacts can be formed in various ways. For example, a contact housing can be formed of the second material having an aversion to plating. A bottom portion of the contact housing can have a raised divider, where the raised divider can have a first side and a second side. The contact housing can further include tabs separated by notches extending upward from the bottom portion of the contact housing. The first material having an affinity for plating can be overmolded on the contact housing. The first material can be overmolded on the bottom portion of the contact housing. The first material can form a first contact portion on a first side of the raised divider and a second contact portion on a second side of the raised divider. The first contact portion can include a first tab extending upward from the bottom portion of the contact housing and filling a first notch between two tabs of the contact housing. The first contact portion can further include a second tab between and nonadjacent to two tabs of the contact housing. The second contact portion can include a first tab extending upward from the bottom portion of the contact housing and filling a first notch between two tabs of the contact housing. The second contact portion can further include a second tab between and nonadjacent to two tabs of the contact housing.

In another example, a contact support structure can be formed of the first material having an affinity for plating materials. The contact support structure can include a first contact portion and a second contact portion. A grove in a bottom portion of the contact support structure can separate the first contact portion and the second contact portion. The contact support structure can include a first tab and a second tab extending upwards from the bottom portion. The second material having an aversion to plating materials can overmolded on the contact support structure. The second material can form a separating portion. This separating portion can be located in the grove in a bottom portion of the contact support structure and can separate the first contact portion from the second contact portion. More specifically, the separating portion can separate the first tab and the first contact portion from the second tab and the second contact portion.

The exposed surfaces of the first contact portion and the second contact portion can then be plated to form a first contact over the first contact portion and a second contact over the second contact portion. More specifically, the entire connector assembly can be placed in a chromium or other etch. This etch can form holes in exposed surfaces of the first material while leaving the exposed surfaces of the second material largely unblemished. An electroless copper plating or other plating can then be applied to the etched connector assembly. The copper plating can adhere to the holes in the first material, giving the first material the property referred to here as having an affinity for plating materials. As a result, a copper layer can be formed on a surface of the first material. The copper plating might not adhere to a surface of the second material, as the second material can have a reduced number of holes at its surface. This can give the second material the property referred to here as having an aversion to plating materials.

The exposed surfaces of the first material including the first contact portion and the second contact portion can then be plated. The plating for the first contact and the second contact can include a copper layer or other bulk layer, such as a tin-copper or other bulk layer that can improve signal quality by lowering contact resistance. The plating can include a barrier layer over the copper layer and a gold flash over the barrier layer, where the copper layer can form an adhesion layer for the top plate. The top plate can be over the gold flash and can provide a durable surface. The barrier layer can be formed of palladium or other material and the top plate can be formed using rhodium-ruthenium, platinum-ruthenium, iridium-ruthenium, or other material.

In these and other embodiments of the present invention, an inside surface of one or more tabs can be soldered to a flexible circuit board, wire, or other conduit. The top plate can be omitted from the inside surface using a masking step from at least these inside surfaces to allow the solder connection. The solder can be applied to these inside surfaces by heating a ball of solder near the inside surface. A steam of air can then be directed at the heated ball. This can cause the ball of solder to aerosolize and coat the inside surface with a coating of solder. This technique can help to reduce surfaces temperatures, which could otherwise cause distortions of the connector assembly.

In these and other embodiments of the present invention, the connector assemblies can be kept small by only using two contacts. These contacts can be used to convey power. They can also be used to convey data, or data can be wirelessly transmitted and received by the electronic device.

Embodiments of the present invention can provide connector assemblies and contacts that can be located in various types of devices, such as portable computing devices, tablet computers, desktop computers, laptops, all-in-one computers, wearable computing devices, cell phones, smart phones, media phones, storage devices, keyboards, covers, charging cases, portable media players, navigation systems, monitors, power supplies, adapters, audio devices and equipment, remote control devices, chargers, and other devices. These connector assemblies can provide pathways for signals and power compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. In one example, the connector assemblies can be used to convey a data signal, a power supply, and ground. In various embodiments of the present invention, the data signal can be unidirectional or bidirectional and the power supply can be unidirectional or bidirectional. In these and other embodiments of the present invention, the connector assemblies can be used to convey power and ground, while data is transmitted wirelessly.

Various embodiments of the present invention can incorporate one or more of these and the other features described herein. A better understanding of the nature and advantages of the present invention can be gained by reference to the following detailed description and the accompanying drawings.

DESCRIPTION OF EXEMPLARY EMBODIMENTS

Figure 1:
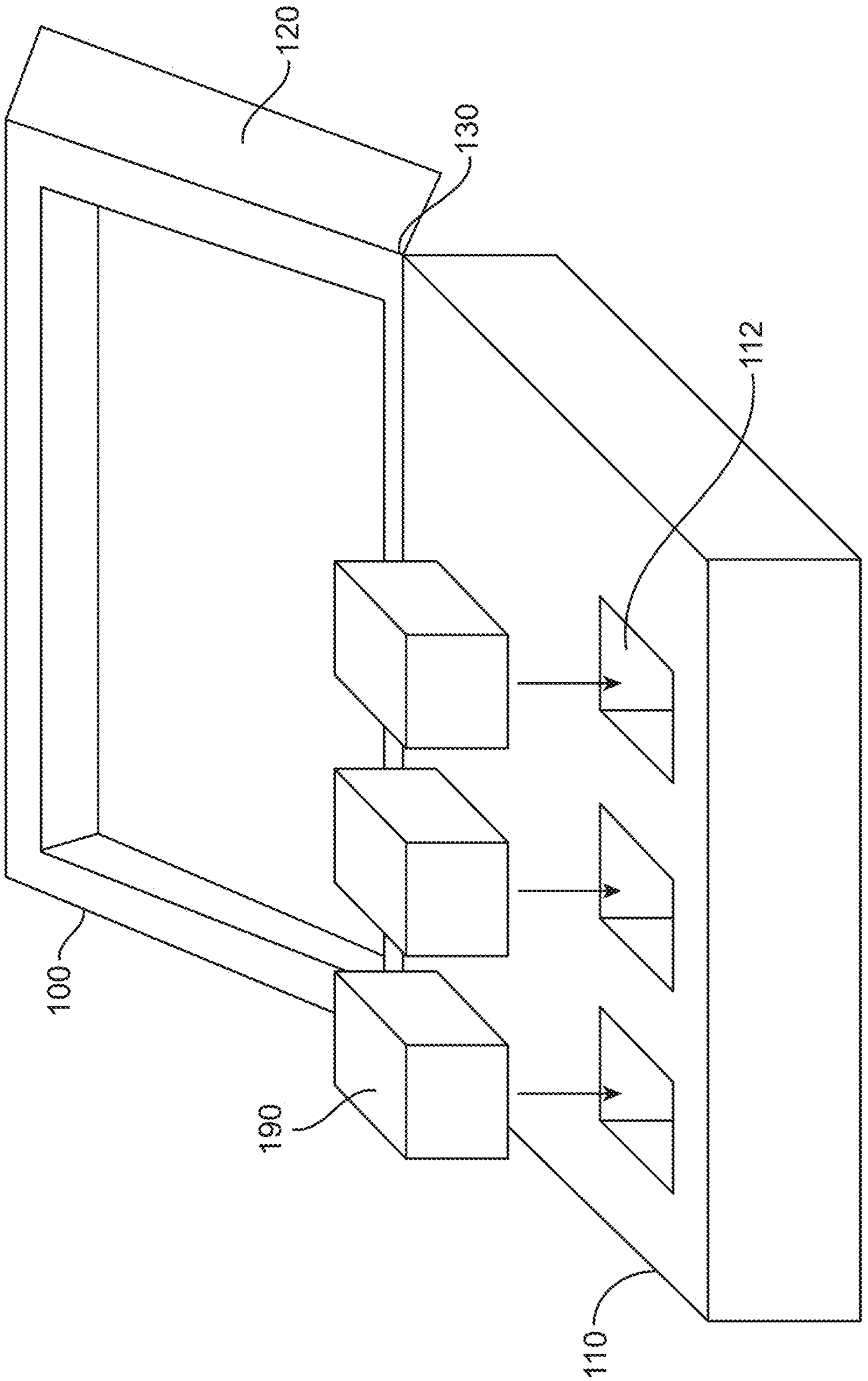
FIG. 1 illustrates an electronic device that can be improved by the incorporation of an embodiment of the present invention.

FIG. 1 illustrates an electronic device that can be improved by the incorporation of an embodiment of the present invention. This figure, as with the other included figures, is shown for illustrative purposes and does not limit either the possible embodiments of the present invention or the claims.

In this example, three accessories 190 can be placed in openings or recesses 112 in base 110 of docking station 100. Docking station 100 can also include optional lid 120, which can be attached to base 110 using hinge 130. Accessories 190 can communicate with docking station 100 when mated with docking station 100. In these and other embodiments of the present invention, accessories 190 can communicate with docking station 100 when accessories 190 are not docked in docking station 100. Also, in various embodiments of the present invention, accessories 190 can communicate with each other through docking station 100 when docked. In these and other embodiments, accessories 190 can communicate with each other when they are not docked in docking station 100. These communications can be wired or wireless. For example, they can be Bluetooth or other wireless communications. Docking station 100 can also provide charging power to one or more of the accessories 190.

In this example, charging and communication between accessories 190 and docking station 100 can take place over the same contact. In these and other embodiments of the present invention, docking station 100 can provide a charging voltage on a first contact and a reference ground on a second contact of an interface between docking station 100 and an accessory 190. Data can be transferred by modulating the charging voltage on the first pin. Docking station 100 can modulate the charging voltage to send data to accessory 190 and accessory 190 can modulate the charging voltage itself to send data to docking station 100. More specifically, the modulation can be done by adding or omitting an intermediate frequency (IF) signal or radio frequency (RF) to the charging voltage.

In this example, three accessories 190 are shown, though in other embodiments, docking station 100 can support one, two, or more than three accessories 190. Docking station 100 can have a relatively flat surface, it can be a case or other container having a lid, or it can have another appropriate form factor. Accessories 190 can be rechargeable batteries, speakers, Bluetooth headphones, headsets, or earbuds, wearable computing or media devices such as jewelry or watches, or other types of accessories. Docking station 100 can include one or more optional receptacles or other surfaces or recesses 112 for supporting accessories 190 during charging and data transfers. Charging and data transfers can occur over electrical connections formed between contacts (not shown) on accessories 190 and contacts (not shown) in or on recesses 112.

Docking station 100 can be powered by an internal battery, external power source, or other appropriate source or combination thereof. Docking station 100 can provide power to and communicate with one or more accessories 190. These communications can include authentication and identification information, firmware and software updates, user provided preferences, or other information.

These and other embodiments of the present invention can provide connector assemblies having molded portions with interlocking features that can help to prevent moisture ingress in an electronic device. The molded portions can be formed of plastics or other materials to provide light-weight connector assemblies and contacts. They can be compact in size and can be readily manufactured using molding and plating techniques. Example connector assembly 200 and example connector assembly 500 are shown in the following figures. One or more of the accessories 190 can include one or more of connector assembly 200 or connector assembly 500, or both.

Figure 2:
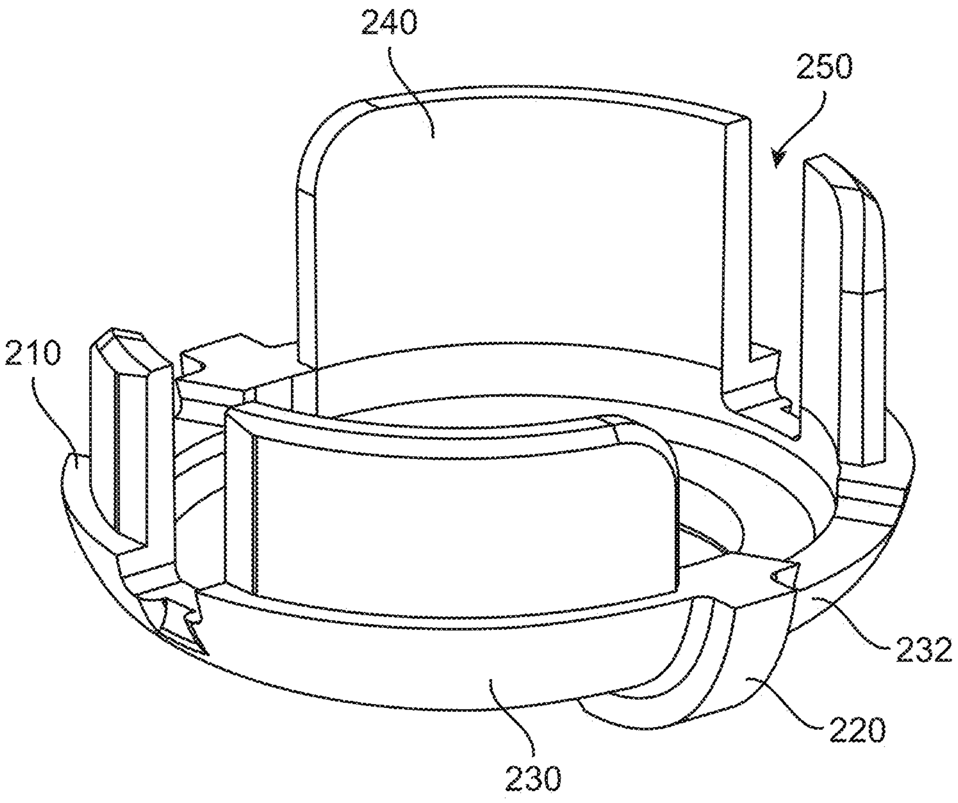
FIG. 2 through FIG. 4 illustrate a method of manufacturing connector assemblies and contacts according to an embodiment of the present invention.
Figure 3:
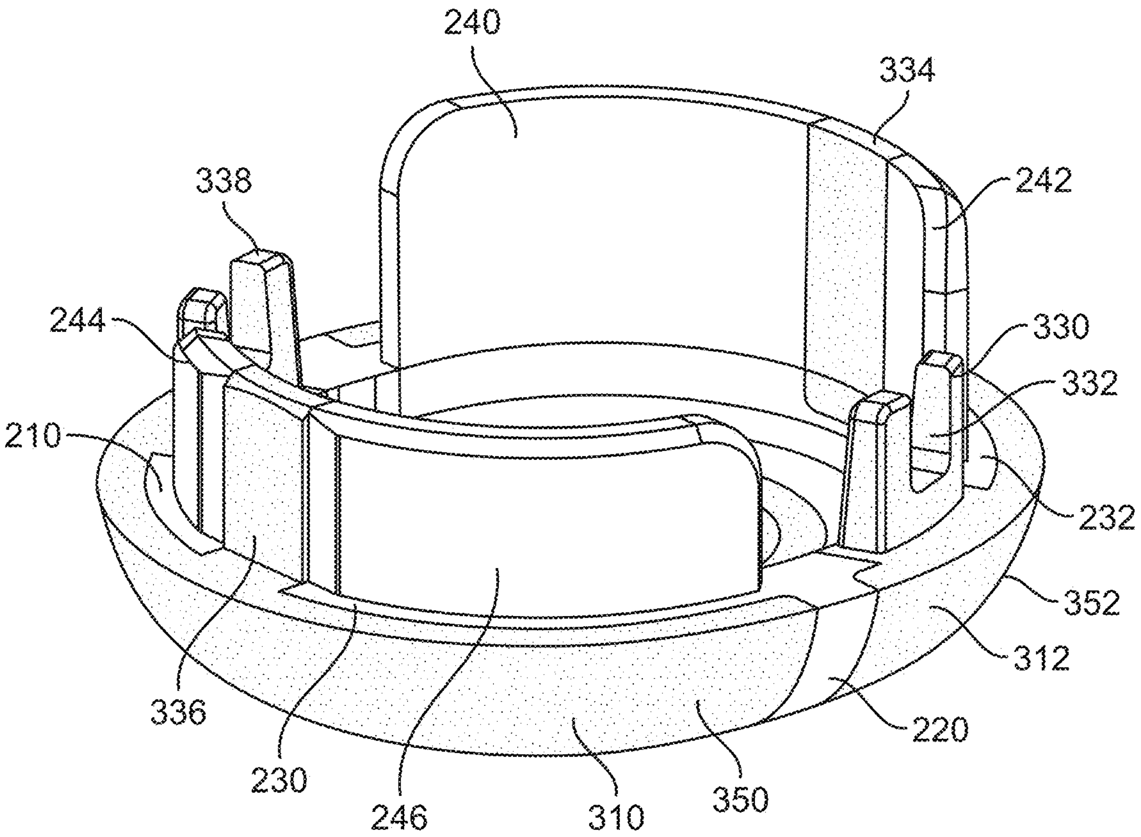
Figure 4:
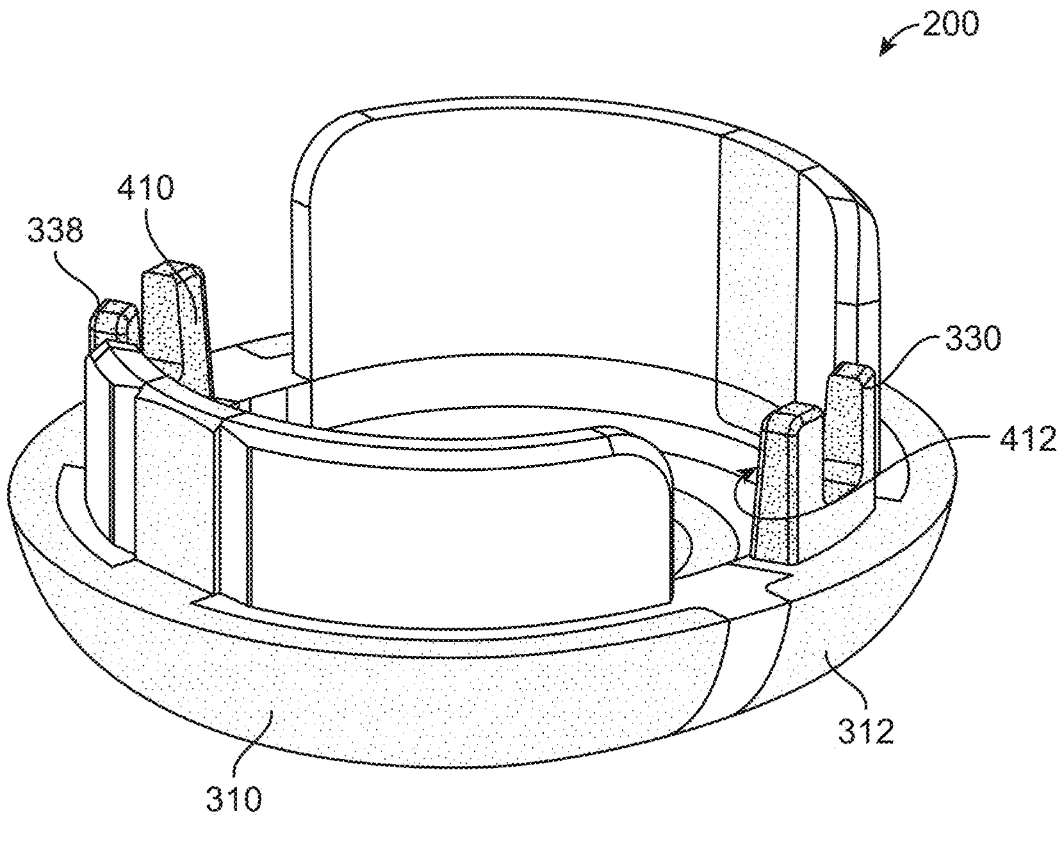

FIG. 2 through FIG. 4 illustrate a method of forming connector assemblies and contacts and according to an embodiment of the present invention. As shown in these figures, first contact portion 310 and second contact portion 312 formed of the first material having an affinity for plating materials can be overmolded on contact housing 210, which can be formed of a second material having an aversion to plating materials. First contact portion 310 can be plated to form first contact 350 and the second contact portion 312 can be plated to form second contact 352. First contact 350 and second contact 352 can be electrically separated by features of the contact housing 210, such as raised divider 220, where raised divider 220 can act as a separating portion.

In FIG. 2, contact housing 210 can be formed using injection molding, insertion molding, 3-D printing, overmolding, or other molding method or other technique. Contact housing 210 can be formed of the second material having an aversion to plating. The second material can be plastic, nylon, polycarbonate, resin, or other material. A bottom portion of the contact housing 210 can have raised divider 220, where raised divider 220 can have a first side and a second side, dividing the bottom portion into a first region 230 and a second region 232. Contact housing 210 can further include tabs 240 separated by notches 250, where the tabs extend upward from the bottom portion of the contact housing 210.

In FIG. 3, the first material having an affinity for plating can be overmolded on contact housing 210. The first material can be overmolded on the bottom portion of the contact housing 210. The first material can have an affinity for plating materials. The first material can be ABS or other thermoplastic polymer, a copolymer combination of polycarbonate and ABS, or other material or combination of materials. The first material can form first contact portion 310 over first region 230 on a first side of raised divider 220 and a second contact portion 312 over second region 232 on a second side of raised divider 220. First contact portion 310 can include a first tab 336 extending upward from the bottom portion of contact housing 210 and filling a first notch between tab 244 and tab 246 of contact housing 210. First contact portion 310 can further include a second tab 338 between and nonadjacent to tab 244 and tab 240 of contact housing 210. Second contact portion 312 can include first tab 334 extending upward from the bottom portion of contact housing 210 and filling a notch between tab 240 and tab 242 of contact housing 210. Second contact portion 312 can further include second tab 330 between and nonadjacent to tab 246 and tab 242 of contact housing 210. Tab 330 and tab 338 can include cutouts 332, which can aid in forming a solder connection to a flexible circuit board, a wire, or other conduit (not shown.)

The exposed surfaces of the first material including first contact portion 310 and second contact portion 312 can then be plated to form first contact 350 over first contact portion 310 and second contact 352 over second contact portion 312. More specifically, the entire connector assembly can be placed in a chromium etch or other type of etch. This etch can form holes in exposed surfaces of the first material while leaving the exposed surfaces of the second material largely unblemished. An electroless copper plating or other plating can then be applied to the etched connector assembly. The copper plating can adhere to the holes in the first material, giving the first material the property referred to here as having an affinity for plating materials. As a result, a copper layer can be formed on a surface of the first material. The copper plating might not adhere to a surface of the second material, as the second material can have a reduced number of holes at its surface. This can give the second material the property referred to here as having an aversion to plating materials.

The plating for first contact 350 and second contact 352 can include the copper layer or other bulk layer, such as a tin-copper or other bulk layer that can improve signal quality by lowering contact resistance. The plating can include a barrier layer over the copper layer and a gold flash over the barrier layer, where the copper layer can form an adhesion layer for the top plate. The top plate can be over the gold flash and can provide a durable surface. The barrier layer can be formed of palladium or other material and the top plate can be formed using rhodium-ruthenium, platinum-ruthenium, iridium-ruthenium, or other material.

In FIG. 4, inside surface 410 of second tab 338 of first contact portion 310 and inside surface 412 of second tab 330 of second contact portion 312 of connector assembly 200 can be coated with solder, such that they can be soldered to a flexible circuit board, wire, or other conduit (not shown.) The top plate can be omitted using a masking step from at least inside surface 410 and inside surface 412 to allow this solder connection. The solder can be applied to inside surface 410 by heating a ball of solder near inside surface 410. A steam of air can then be directed at the heated ball. This can cause the ball of solder to aerosolize and coat inside surface 410 with a coating of solder. This can be repeated for inside surface 412. This technique can help to reduce surfaces temperatures, which could otherwise cause distortions of the connector assembly.

FIG. 5 through FIG. 8 illustrate a method of forming connector assemblies and contacts according to an embodiment of the present invention. As shown in these figures, first contact portion 520 and second contact portion 522 formed of the first material having an affinity for plating materials can be formed as parts of contact support structure 510. Separating portion 610 can be overmolded on contact support structure 510, and can be formed of a second material having an aversion to plating materials. First contact portion 520 can be plated to form first contact 530 and second contact portion 522 can be plated to form second contact 532. First contact 530 and second contact 532 can be electrically separated by separating portion 610.

Figure 5:
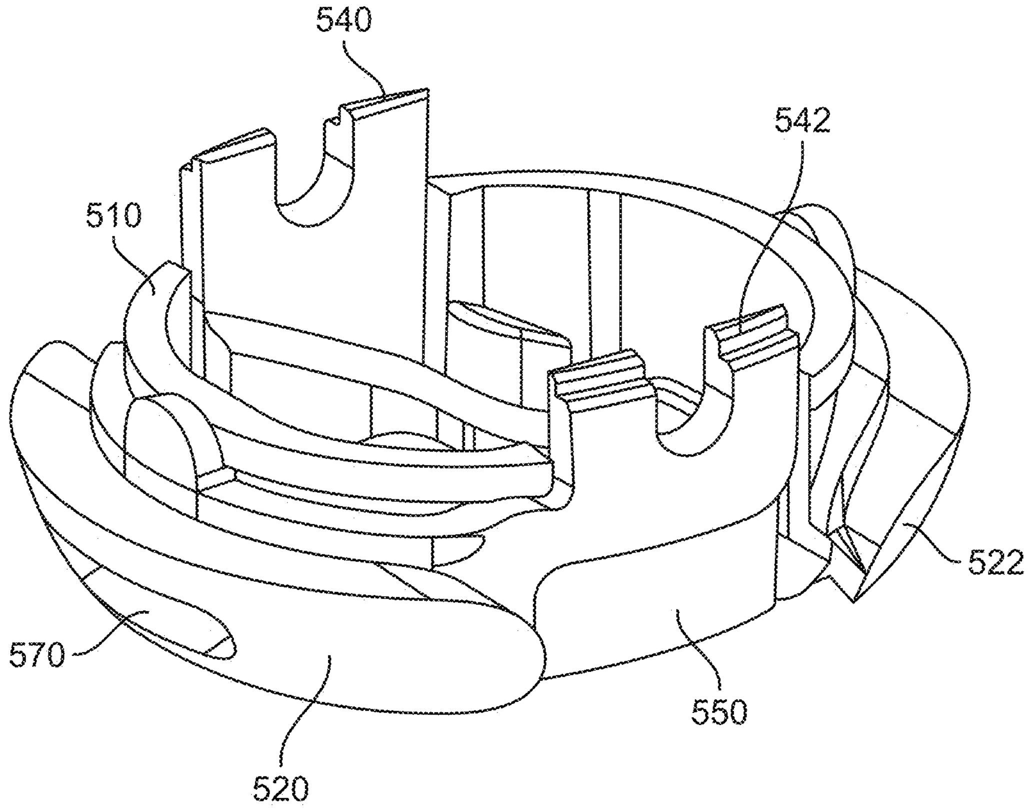
FIG. 5 through FIG. 8 illustrate another method of manufacturing connector assemblies and contacts according to an embodiment of the present invention.

In FIG. 5, contact support structure 510 can be formed using injection molding, insertion molding, 3-D printing, over-molding, or other molding method or other technique.

Contact support structure 510 can be formed of the first material having an affinity for plating materials. The first material can be ABS or other thermoplastic polymer, a copolymer combination of polycarbonate and ABS, or other material or combination of materials. A bottom portion of the contact support structure 510 can include first contact portion 520 and second contact portion 522. First contact portion 520 and second contact portion 522 can be separated by groove 550 or other feature. Contact support structure 510 can further include tab 540 and tab 542, where the tabs extend upward from the bottom portion of the contact housing 210. First contact portion 520 can include opening 570. Second contact portion 522 can include a similar opening (not shown.)

Figure 6:
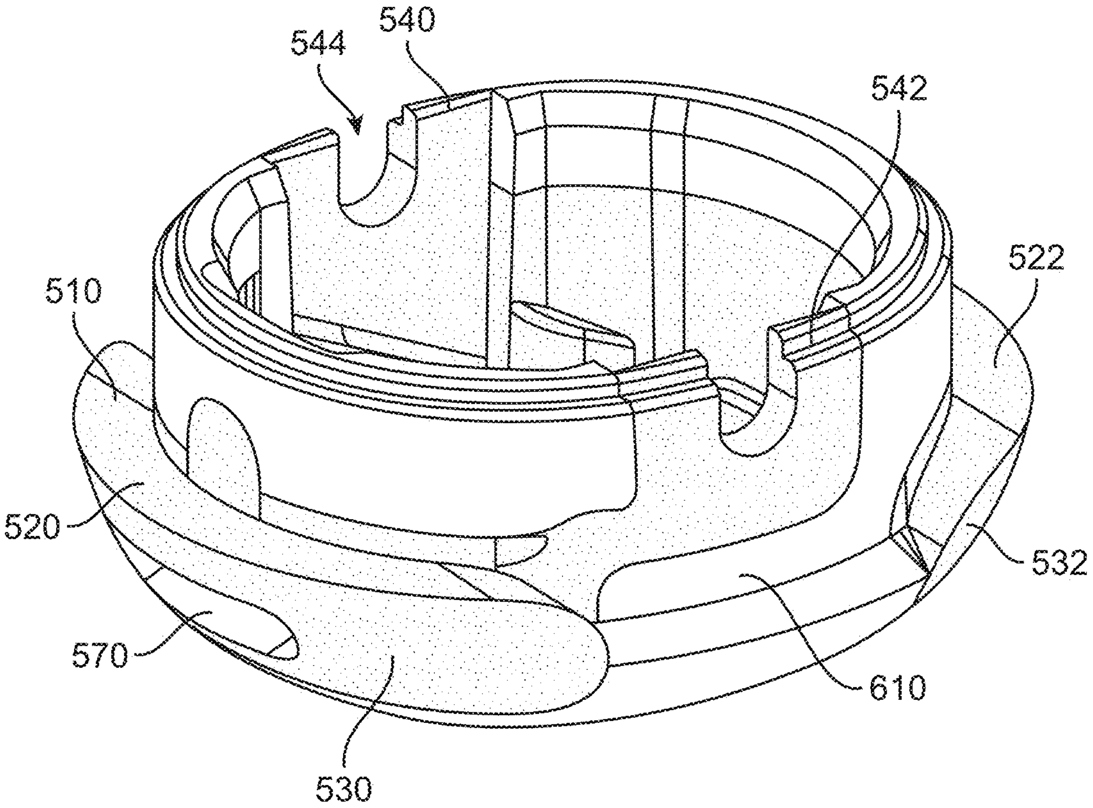

In FIG. 6, the second material having an aversion for plating material can be overmolded as separating portion 610 on contact support structure 510. The separating portion 610 can be overmolded in groove 550 (shown in FIG. 5) on the bottom portion of the contact support structure 510 between first contact portion 520 and second contact portion 522. The second material can be plastic, nylon, polycarbonate, resin, or other material. First contact portion 520 can include tab 542 extending upward from the bottom portion of contact support structure 510. Second contact portion 522 can include tab 540 extending upward from the bottom portion of contact support structure 510. Tab 540 and tab 542 can include cutouts 544, which can aid in forming a solder connection to a flexible circuit board, a wire, or other conduit (not shown.) First contact portion 520 can include opening 570. Second contact portion 522 can include a similar opening (not shown.)

The exposed surfaces of the first material including first contact portion 520 and second contact portion 522 can then be plated to form first contact 530 over first contact portion 520 and second contact 532 over second contact portion 522. More specifically, the entire connector assembly can be placed in a chromium etch or other type of etch. This etch can form holes in exposed surfaces of the first material while leaving the exposed surfaces of the second material largely unblemished. An electroless copper plating or other plating can then be applied to the etched connector assembly. The copper plating can adhere to the holes in the first material, giving the first material the property referred to here as having an affinity for plating materials. As a result, a copper layer can be formed on a surface of the first material. The copper plating might not adhere to a surface of the second material, as the second material can have a reduced number of holes at its surface. This can give the second material the property referred to here as having an aversion to plating materials.

The exposed surfaces of the first material including first contact portion 520 and second contact portion 522 can then be plated. The plating for first contact 530 and second contact 532 can include a copper layer or other bulk layer, such as a tin-copper or other bulk layer that can improve signal quality by lowering contact resistance. The plating can include a barrier layer over the copper layer and a gold flash over the barrier layer, where the copper layer can form an adhesion layer for the top plate. The top plate can be over the gold flash and can provide a durable surface. The barrier layer can be formed of palladium or other material and the top plate can be formed using rhodium-ruthenium, platinum-ruthenium, iridium-ruthenium, or other material.

Figure 7:
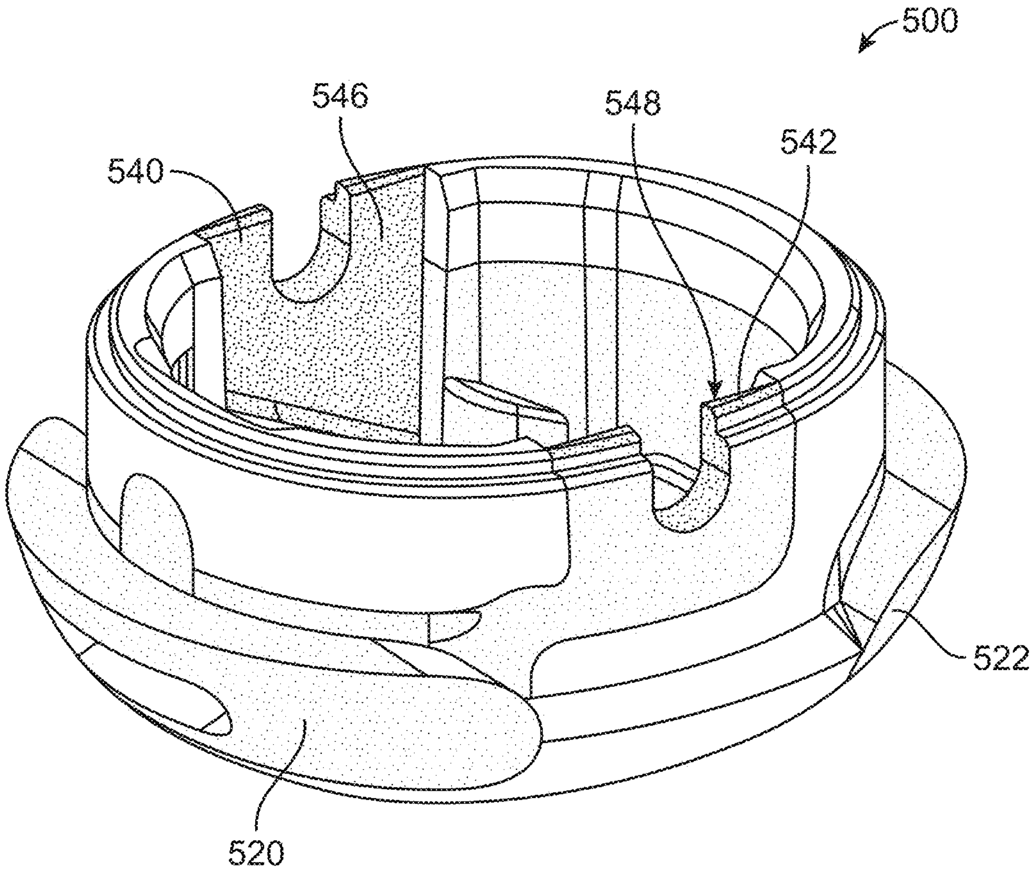

In FIG. 7, inside surface 548 of tab 542 of first contact portion 520 and inside surface 546 of tab 540 of second contact portion 522 of connector assembly 500 can be coated with solder, such that they can be soldered to a flexible circuit board, wire, or other conduit (not shown.) The top plate can be omitted using a masking step from at least inside surface 546 and inside surface 548 to allow this solder connection. The solder can be applied to inside surface 546 by heating a ball of solder near inside surface 546. A steam of air can then be directed at the heated ball. This can cause the ball of solder to aerosolize and coat inside surface 546 with a coating of solder. This can be repeated for inside surface 548. This technique can help to reduce surfaces temperatures, which could otherwise cause distortions of the connector assembly.

Using contact support structure 510 in this example can provide a more durable connector assembly than using contact housing 210 in the example shown in FIG. 2 through FIG. 4. For example, first contact portion 520 and second contact portion 522 can be a single piece instead of separate, (that is, formed as part of a unitary contact support structure) as are first contact portion 310 and second contact portion 312. This can be important if an electronic device housing either connector assembly 200 or connector assembly 500 is dropped.

In these and other embodiments of the present invention, the first material can have a lower melting temperature than the second material. Where the first material is molded first, as in connector assembly 500, a certain amount of melting of the first material can occur when the second material is overmolded. This can help to seal the two materials together thereby providing a connector assembly having reduced moisture ingress. If excess heating occurs, warping, discoloration, or other damage to the first material can occur.

In these and other embodiments of the present invention, each exposed surface of the first material can be plated. Separating portion 610 can cover otherwise exposed areas of contact support structure 510 to prevent first contact 530 from being electrically connected to second contact 532. In some locations, such as a bottom inside surface 820 (shown in FIG. 8) of connector assembly 500, masking or other techniques can be used to keep first contact 530 electrically isolated from second contact 532. An example is shown in the following figure.

Figure 8:
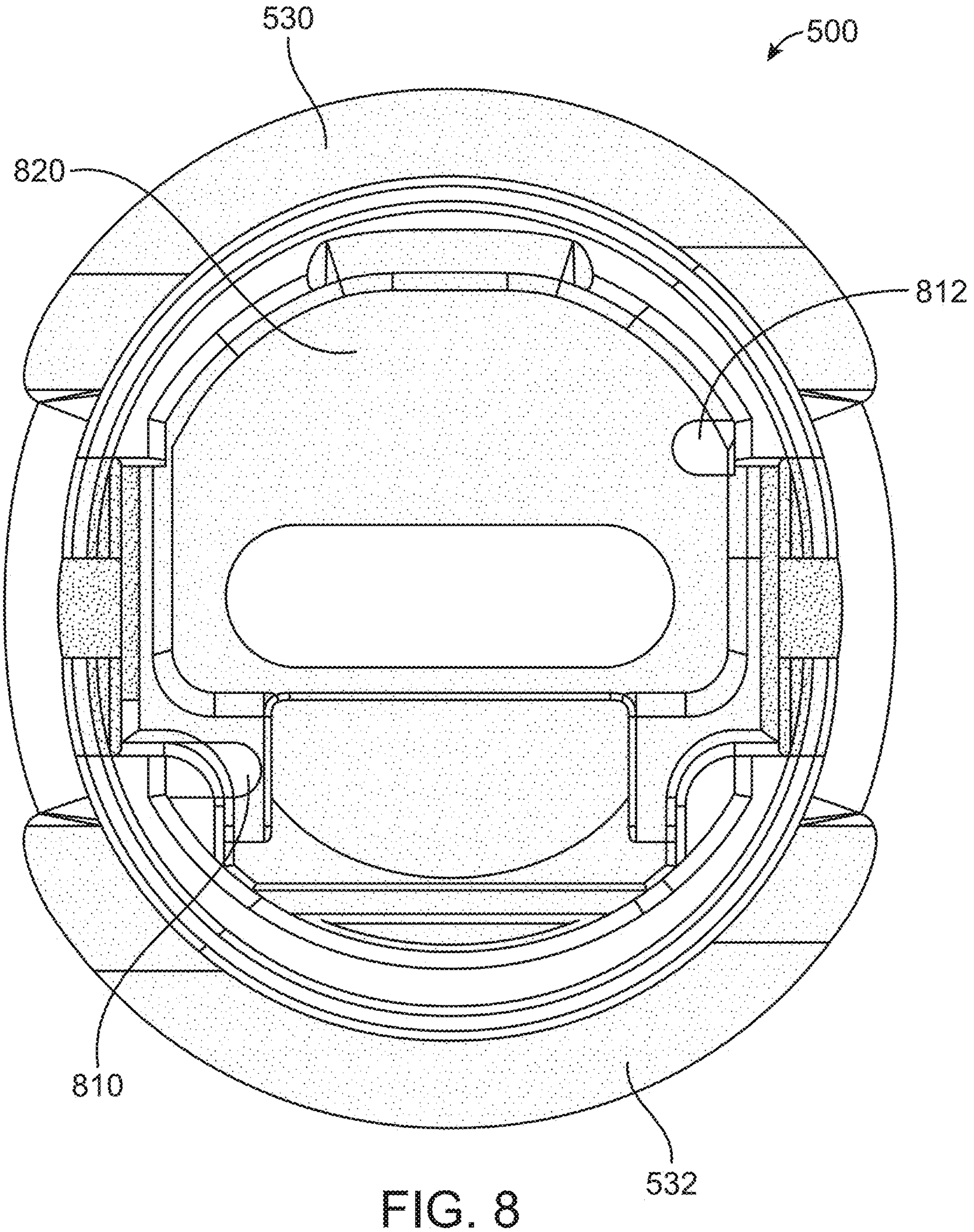

In FIG. 8, bottom inside surface 820 of connector assembly 500 can be masked during plating to help to keep first contact 530 electrically isolated from second contact 532. This masking can be done using a spray that provides a layer having an aversion to plating layers. Tape can also be cut to fit and placed on bottom inside surface 820 of connector assembly 500. Bottom inside surface 820 of connector assembly 500 can be coated with a non-conducive paint that has an aversion to plating materials. This paint can form a non-conductive surface that can help to keep first contact 530 electrically isolated from second contact 532. A boot or other piece, which can be made of silicon or other material, can be placed in connector assembly 500 during plating and removed afterward. Tabs 810 and 812 can be formed as part of separating portion 610 to simplify masking.

In another example, portions of a contact can be formed using a deep-drawn process, after which they can be joined and insert molded into a connector assembly. For example, a cover forming an outside surface of a contact can be formed by a deep drawn process. A stiffener can similarly be drawn. The stiffener can be fit in the cover. Two or more such contacts can be placed in proximity and a contact housing can be injection molded around inside surfaces of the contacts to form a connector assembly. Various steps, such as forming a chamfer on an inside surface of each contact, can be performed on a reel-to-reel spool of contacts using computer-numerically controlled machinery. This can provide a highly automated method of manufacturing connector assemblies.

In these and other embodiments of the present invention, the connector assemblies can be kept small by only using two contacts. These contacts can be used to convey power. They can also be used to convey data, or data can be wirelessly transmitted and received by the electronic device. In these and other embodiments of the present invention, connector assembly 200 and connector assembly 500 can each support one, three, or more than three contacts.

Embodiments of the present invention can provide connector assemblies and contacts that can be located in various types of devices, such as portable computing devices, tablet computers, desktop computers, laptops, all-in-one computers, wearable computing devices, cell phones, smart phones, media phones, storage devices, keyboards, covers, charging cases, portable media players, navigation systems, monitors, power supplies, adapters, audio devices and equipment, remote control devices, chargers, and other devices. These connector assemblies can provide pathways for signals and power compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. In one example, the connector assemblies can be used to convey a data signal, a power supply, and ground. In various embodiments of the present invention, the data signal can be unidirectional or bidirectional and the power supply can be unidirectional or bidirectional. In these and other embodiments of the present invention, the connector assemblies can be used to convey power and ground, while data is transmitted wirelessly.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector assembly comprising:

a first contact portion formed of a first material, where the first material has an affinity for plating materials;

a second contact portion formed of the first material;

a separating portion formed of a second material, where the second material has an aversion to plating materials;

a first contact plated on an exposed surface of the first contact portion; and a second contact plated on an exposed surface of the second contact portion, wherein the first contact and the second contact are separated by the separating portion.

2. The connector assembly of claim 1 wherein the first material comprises acrylonitrile butadiene styrene and the second material comprises polycarbonate.

3. The connector assembly of claim 2 wherein the first contact portion and the second contact portion are formed as separate portions separated by the separating portion.

4. The connector assembly of claim 3 wherein the separating portion comprises a first molded portion and the first contact portion and the second contact portion are overmolded on the first molded portion.

5. The connector assembly of claim 4 wherein the plating for the first contact and the second contact comprises a copper layer, a barrier layer over the copper layer, a gold flash over the barrier layer, and a top plate over the gold flash.

6. The connector assembly of claim 5 wherein the barrier layer comprises palladium and the top plate comprises at least one of rhodium-ruthenium, platinum-ruthenium, or iridium-ruthenium.

7. The connector assembly of claim 2 wherein the first contact portion and the second contact portion are formed as part of a unitary contact support structure.

8. The connector assembly of claim 7 wherein the unitary contact support structure comprises a first molded portion and the separating portion is overmolded on the first molded portion.

9. The connector assembly of claim 8 wherein the plating for the first contact and the second contact comprises a copper layer, a barrier layer over the copper layer, a gold flash over the barrier layer, and a top plate over the gold flash.

10. The connector assembly of claim 9 wherein the barrier layer comprises palladium and the top plate comprises at least one of rhodium-ruthenium, platinum-ruthenium, or iridium-ruthenium.

11. The connector assembly of claim 1 wherein the first material is a first type of plastic and the second material is a second type of plastic.

12. A connector assembly for an electronic device, the connector assembly comprising:

a unitary contact support structure comprising a first contact portion and a second contact portion, the unitary contact support structure formed of a first material, the first material having an affinity for plating materials, wherein the unitary contact support structure comprises a groove between the first contact portion and the second contact portion;

a separating portion between the first contact portion and the second contact portion, the separating portion formed of a second material, the second material having an aversion to plating materials;

a first contact plated on an exposed surface of the first contact portion; and a second contact plated on an exposed surface of the second contact portion, wherein the first contact and the second contact are separated by the separating portion.

13. The connector assembly of claim 12 wherein the second material comprises polycarbonate.

14. The connector assembly of claim 13 wherein the first material comprises acrylonitrile butadiene styrene.

15. The connector assembly of claim 14 wherein the plating for the first contact and the second contact comprises a copper layer, a barrier layer over the copper layer, a gold flash over the barrier layer, and a top plate over the gold flash, wherein the barrier layer comprises palladium and the top plate comprises at least one of rhodium-ruthenium, platinum-ruthenium, or iridium-ruthenium.

16. The connector assembly of claim 12 wherein the first material comprises a thermoplastic polymer.

17. The connector assembly of claim 12 wherein at least a portion of the groove is filled with the separating portion.

18. The connector assembly of claim 16 wherein the first material is a first type of plastic and the second material is a second type of plastic.

19. A connector assembly for an electronic device, the connector assembly comprising:

a contact support structure comprising a first contact portion and a second contact portion, the contact support structure formed of a first material, wherein the first contact portion and the second contact portion extend from the contact support structure, the first material having an affinity for plating materials;

an overmold on the contact support structure and between the first contact portion and the second contact portion, the overmold formed of a second material, where the second material has an aversion to plating materials;

a first contact plated on an exposed surface of the first contact portion; and a second contact plated on an exposed surface of the second contact portion, wherein the first contact and the second contact are separated by the overmold.

20. The connector assembly of claim 19 wherein the second material comprises polycarbonate.

21. The connector assembly of claim 20 wherein the first material comprises a thermoplastic polymer.

22. The connector assembly of claim 21 wherein the first material comprises acrylonitrile butadiene styrene.

23. The connector assembly of claim 22 wherein the plating for the first contact and the second contact comprises a copper layer, a barrier layer over the copper layer, a gold flash over the barrier layer, and a top plate over the gold flash, wherein the barrier layer comprises palladium and the top plate comprises at least one of rhodium-ruthenium, platinum-ruthenium, or iridium-ruthenium.

24. The connector assembly of claim 19 wherein the contact support structure is formed as a unitary contact support structure.

25. The connector assembly of claim 24 wherein the first material is a first type of plastic and the second material is a second type of plastic.

* * * * *